United States Patent [19]

David et al.

[11] Patent Number: 5,600,377
[45] Date of Patent: Feb. 4, 1997

[54] APPARATUS AND METHOD FOR MOTION COMPENSATING VIDEO SIGNALS TO PRODUCE INTERPOLATED VIDEO SIGNALS

[75] Inventors: Morgan W. A. David, Farnham; Stephen M. Keating, Reading; Martin R. Dorricott, Basingstoke; James E. Burns, Basingstoke, all of United Kingdom

[73] Assignees: Sony Corporation, Tokyo, Japan; Sony United Kingdom Limited, Weybridge, England

[21] Appl. No.: 118,239

[22] Filed: Sep. 9, 1993

[30] Foreign Application Priority Data

Nov. 10, 1992 [GB] United Kingdom .................... 9223510

[51] Int. Cl.$^6$ ...................................................... H04N 7/01
[52] U.S. Cl. ............................................ 348/452; 348/441
[58] Field of Search ...................................... 348/452, 451, 348/443–445, 447, 448, 458, 459, 431, 430, 427, 424, 425; H04N 7/01, 7/00

[56] References Cited

U.S. PATENT DOCUMENTS

| | | | |
|---|---|---|---|
| 4,731,651 | 3/1988 | Matsumoto et al. ...................... | 348/443 |
| 4,864,393 | 9/1989 | Harradine et al. ....................... | 348/443 |
| 4,965,667 | 10/1990 | Trew et al. ............................... | 348/425 |
| 5,060,064 | 10/1991 | Lamnabhi et al. ....................... | 348/443 |
| 5,162,907 | 11/1992 | Keating et al. .......................... | 348/441 |
| 5,347,312 | 9/1994 | Saunders et al. ........................ | 348/443 |
| 5,363,146 | 11/1994 | Saunders et al. ........................ | 348/443 |
| 5,404,170 | 4/1995 | Keating .................................... | 348/443 |

FOREIGN PATENT DOCUMENTS

| | | | |
|---|---|---|---|
| 0348186 | 12/1989 | European Pat. Off. ......... | H04N 7/00 |
| 221367 | 1/1990 | United Kingdom ............. | H04N 7/12 |

*Primary Examiner*—Safet Metjahic
*Attorney, Agent, or Firm*—William S. Frommer; Alvin Sinderbrand

[57] ABSTRACT

Motion compensated video signal processing apparatus comprises a subsampler for horizontally subsampling an input digital video signal, to generate a subsampled video signal; a motion vector processor for generating motion vectors from the subsampled video signal; and a motion compensated video processor for processing the input digital video signal according to the motion vectors, to generate an output digital video signal.

16 Claims, 6 Drawing Sheets present interpolated

APPARATUS AND METHOD FOR MOTION COMPENSATING VIDEO SIGNALS TO PRODUCE INTERPOLATED VIDEO SIGNALS

BACKGROUND OF THE INVENTION

1. Field of the Invention

This invention relates to motion compensated video signal processing.

2. Description of the Prior Art

Motion compensated video signal processing is used in video signal processing applications such as television standards conversion, film standards conversion or video to film conversion. An example of a previously proposed motion compensated video processing apparatus is described in the British Published Patent Application number GB-A-2 231 749, in which pairs of temporally adjacent images (fields or frames) of a digital video signal are processed to generate corresponding sets of motion vectors. The processing is carried out on discrete blocks of the images, so that each motion vector represents the inter-image motion of the contents of a respective block.

Each set of motion vectors is then supplied to a motion vector reducer which derives a subset of the set of motion vectors for each block, which is then passed to a motion vector selector which assigns one of the subset of motion vectors to each picture element (pixel) in each block of the image. The selected motion vector for each pixel is supplied to a motion compensated interpolator which interpolates output images from the input images, taking into account the motion between the input images.

Motion compensated video signal processing such as that described above requires powerful and complex processing apparatus to carry out the very large number of calculations required to generate and process motion vectors for each pair of input images. This is particularly true if the images are in a high definition format, or if the processing is to be performed on an input video signal to produce an output video signal in real time, in which case multiple sets of identical apparatus may be operated in parallel in order to generate sets of motion vectors for each output image in the time available (e.g. an output field period).

SUMMARY OF THE INVENTION

It is an object of the invention to reduce the data processing required to perform motion compensated video signal processing.

This invention provides a motion compensated video signal processing apparatus comprising: a subsampler for horizontally subsampling an input digital video signal, to generate a subsampled video signal; a motion vector processor for generating motion vectors from said subsampled video signal; and a motion compensated video processor for processing said input digital video signal according to said motion vectors, to generate an output digital video signal.

As mentioned above, motion compensated video signal processing places great demands on the processing capacity of a video signal processing apparatus. The invention recognises that by generating motion vectors from a horizontally subsampled version of an input video signal, and then effectively oversampling those motion vectors for use in motion compensated processing of the input video signal, these demands can be relaxed. This can obviate or reduce the need for parallel processing to generate the motion vectors in real time, leading to a reduction in the complexity (and the corresponding cost and size) of the apparatus.

Although the apparatus could operate on progressively scanned video frames, it is preferred that the input digital video signal comprises successive interlaced input video fields; and that the output digital video signal comprises successive interlaced output video fields.

For use in, for example, a television standards conversion apparatus, it is preferred that the motion compensated video processor comprises a motion compensated interpolator for interpolating video fields of the output digital video signal from corresponding pairs of video fields of the input digital video signal, the motion vectors representing image motion between at least a subset of the pairs of video fields of the input digital video signal.

Although many different horizontal subsampling techniques could be employed, resulting in various degrees of subsampling of the input digital video signal, it is preferred that the input digital video signal comprises data representing successive horizontally scanned lines of pixels; and the subsampler comprises means for horizontally decimating each line of pixels of the input digital video signal, thereby substantially halving the number of pixels in each line.

In a preferred embodiment the subsampler comprises means for vertically subsampling the input digital video signal. Although it would be possible to employ progressive scan conversion of fields of the input digital video signal followed by a vertical decimation process, it is advantageously straightforward to perform vertical subsampling by using means for vertically displacing pixels of the input digital video signal. Because the interlaced fields each comprise only alternate video lines, the displaced fields generated by the vertical displacement may be used in place of progressively scanned frames which have been subsampled by a factor of two.

Preferably the means for vertically displacing pixels is operable to displace pixels of alternate video fields of the input digital video signal in opposite vertical directions, in order that the resulting displaced fields have lines of pixels at corresponding vertical positions.

In a preferred embodiment, the subsampler comprises means for temporally subsampling the input video signal.

Although temporal subsampling could be performed in various ways, it is preferred that the apparatus comprises means for selecting the corresponding pairs of temporally adjacent fields of the input digital video signal for use in interpolation of respective fields of the output digital video signal; and that the subsampler comprises means for supplying only those pairs of input fields selected for use in interpolation of a predetermined subset of the fields of the output digital video signal to the motion vector processor for use in the generation of motion vectors.

Preferably the predetermined subset comprises alternate fields of the output digital video signal. In this case, it is preferred that the motion compensated video processor comprises means for interpolating two or more fields of the output video signal according to motion vectors generated from one pair of fields of the input digital video signal.

When the video signal from which motion vectors are generated has been spatially subsampled, the resulting motion vectors will have a lower spatial resolution than would be the case if spatial subsampling were not performed. In a preferred embodiment the spatial resolution of the motion vectors is increased by employing a motion vector processor comprising: means for comparing a search block within one of each pair of fields of the subsampled video signal supplied to the motion vector processor with a respective search area, comprising a plurality of blocks, in the other of the pair of fields, to generate an array of original correlation values representing correlation between the search block and the search area; means for generating one or more interpolated correlation values from the original correlation values; and means for detecting an original correlation value or interpolated correlation value representing a point of maximum correlation between the search block and the search area, and for generating a motion vector in dependence on the detected correlation value.

Preferably the means for generating comprises: means for detecting an original correlation value representing the highest correlation in the array of original correlation values; and means for generating a plurality of interpolated correlation values adjacent to the original correlation value representing the highest correlation in the array of original correlation values.

In order to avoid alias problems, it is preferred that the subsampler comprises means for low-pass filtering the input video signal prior to subsampling the input video signal.

In another preferred embodiment the spatial resolution of the selection of motion vectors can be improved, to alleviate a loss in resolution caused by the subsampling process, by employing a motion vector processor operable to generate a plurality of motion vectors for each pixel of each output field of the output digital video signal from the corresponding pair of input fields of the input digital video signal; and apparatus comprising means for testing the motion vectors, to select a motion vector for use in interpolation of a pixel of an output field, comprising means for detecting correlation between test blocks of the pair of input fields pointed to by a motion vector under test, each test block comprising test pixels of the pair of input fields pointed to by the motion vector under test and pixels interpolated from the test pixels; and means for selecting, from the plurality of motion vectors, that motion vector having the highest correlation between the test blocks pointed to by that motion vector.

The generation of a plurality of motion vectors for each pixel of each output field can be performed by generating a plurality of motion vectors for each of a plurality of blocks of pixels of the output fields. In this way a plurality of motion vectors are in fact generated for each pixel, although that plurality will be identical to those generated for other pixels in the same block.

Viewed from a second aspect this invention provides a method of motion compensated video signal processing, said method comprising the steps of: horizontally subsampling an input digital video signal, to generate a subsampled video signal; generating motion vectors from said subsampled video signal; and processing said input digital video signal according to said motion vectors, to generate an output digital video signal.

Viewed from a third aspect this invention provides apparatus for generating motion vectors representing image motion between a pair of images of a video signal, said apparatus comprising: means for comparing a search block within one of said pair of images with a respective search area, comprising a plurality of blocks, in the other of said pair of images, to generate an array of original correlation values representing correlation between said search block and said search area; means for generating one or mope interpolated correlation values from said original correlation values; and means for detecting an original correlation value or interpolated correlation value representing a point of maximum correlation between said search block and said search area, and for generating a motion vector in dependence on said detected correlation value. This third aspect of the invention can be employed to increase the spatial resolution of motion vector generation from non-subsampled video fields of frames to sub-pixel resolution.

Viewed from a fourth aspect this invention provides a method of generating motion vectors representing image motion between a pair of images of a video signal, said method comprising the steps of: comparing a search block within one of said pair of images with a respective search area, comprising a plurality of blocks, in the other of said pair of images, to generate an array of original correlation values representing correlation between said search block and said search area; generating one or more interpolated correlation values from said original correlation values; and detecting an original correlation value or interpolated correlation value representing a point of maximum correlation between said search block and said search area, and for generating a motion vector in dependence on said detected correlation value.

Viewed from a fifth aspect this invention provides a motion compensated video signal processing apparatus in which motion vectors are generated to represent image motion between a pair of input images from which an output image is to be derived by motion compensated interpolation; each said input image and said output image comprising a respective plurality of pixels, said apparatus comprising: means for generating a plurality of motion vectors for each pixel of said output image; means for testing said motion vectors, to select a motion vector for use in interpolation of a pixel of said output image, comprising means for detecting correlation between test blocks of said input images pointed to by a motion vector under test, each test block comprising test pixels of said input images pointed to by said motion vector under test and pixels interpolated from said test pixels; and means for selecting, from said plurality of motion vectors, said motion vector having a highest correlation between said test blocks pointed to by said motion vector. This fifth aspect of the invention can be employed to increase the resolution of the motion vector selection process.

Viewed from a sixth aspect this invention provides a method of motion compensated video signal processing in which motion vectors are generated to represent image motion between a pair of input images from which an output image is to be derived by motion compensated interpolation; each said input image and said output image comprising a respective plurality of pixels, said method comprising the steps of: generating a plurality of motion vectors for each pixel of said output image; testing said motion vectors, to select a motion vector for use in interpolation of a pixel of said output image, by detecting correlation between test blocks of said input images pointed to by a motion vector under test, each test block comprising test pixels of said input images pointed to by said motion vector under test and pixels interpolated from said test pixels; and selecting, from said plurality of motion vectors, a motion vector having a highest correlation between said test blocks pointed to by said motion vector.

The invention is particularly useful when employed in, for example, a television standards conversion apparatus.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
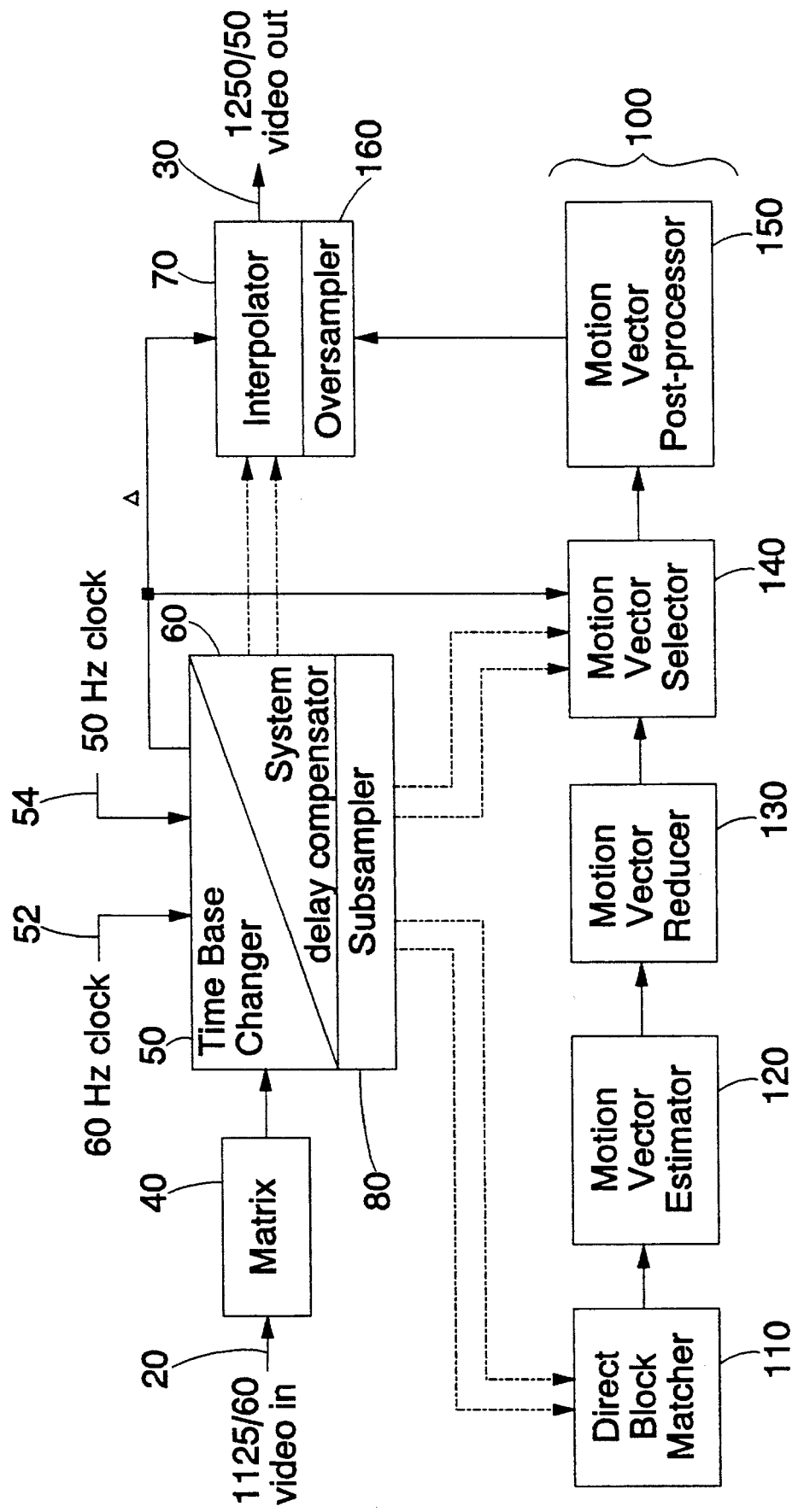
FIG. 1 is a schematic block diagram of a motion compensated television standards conversion apparatus.

FIG. 1 is a schematic block diagram of a motion compensated television standards conversion apparatus for converting an input interlaced digital high definition video signal (HDVS) 20, having 1125 lines per frame and 60 fields per second, into an output interlaced digital HDVS 30 having 1250 lines per frame and 50 fields per second.

The input video signal 20 is First supplied to a matrix circuit 40 in which (if necessary) the input video signal's format is converted to the standard CCIR recommendation 601 (Y,Cr,Cb) format. From the matrix circuit 40 the input video signal is passed to a time base changer 50, which also receives as inputs a 60 Hz clocking signal 52 locked to the field frequency of the input video signal 20 and a 50 Hz clocking signal 54 locked to the required field frequency of the output video signal 30. The time base changer 50 determines the temporal position of each field of the output video signal 30, and selects the two fields of the input video signal 20 which are temporally closest to that output field for use in interpolating that output field. For each field of the output video signal 30, the two input fields selected by the time base changer are supplied, via a system delay compensator 60, to an interpolator 70 in which that output field is interpolated. A control signal Δ, indicating the temporal position of each output field with respect to the two selected input fields, is also generated by the time base changer 50 and is supplied to the interpolator 70.

Pairs of fields of the input video signal 20 are supplied from the system delay compensator 60, via a subsampler 80 (to be described below), to a motion processor 100 comprising a direct block matcher 110, a motion vector estimator 120, a motion vector reducer 130, a motion vector selector 140 and a motion vector post-processor 150. The pairs of input fields are supplied first to the direct block matcher 110 which calculates correlation surfaces representing the spatial correlation between search blocks in the temporally earlier of the two selected input fields and (larger) search areas in the temporally later of the two input fields. These correlation surfaces are passed to the motion vector estimator 120 which detects points of greatest correlation (correlation maxima) in the correlation surfaces to generate a set of motion vectors which are supplied to the motion vector reducer 130. The motion vector estimator 120 also performs a confidence test on each generated motion vector to establish whether that motion vector is significant above the general noise level, and associates a confidence flag with each motion vector indicative of the result of the confidence test.

The motion vector reducer 130 operates to reduce the choice of possible motion vectors for each pixel of the output field, before the motion vectors are supplied to the motion vector selector 140. The output field is notionally divided into blocks of pixels, each block having a corresponding position in the output field to that of a search block in the earlier of the selected input fields. The motion vector reducer compiles a group of four motion vectors to be associated with each block of the output field, with each pixel in that block eventually being interpolated using a selected one of that group of four motion vectors.

As part of its function the motion vector reducer 130 counts the frequencies of occurrence of "good" motion vectors (i.e. motion vectors which pass the confidence test), with no account taken of the position of the blocks of the input fields used to obtain those motion vectors. The good motion vectors are then ranked in order of decreasing frequency. The three most common of the good motion vectors which are significantly different to one another are then classed as "global" motion vectors. Three motion vectors which pass the confidence test are then selected for each block of output pixels and are supplied with the zero motion vector, to the motion vector selector 140 for further processing. These three selected motion vectors are selected in a predetermined order of preference from the motion vector generated from the corresponding search block, those generated from surrounding search blocks, and finally the global motion vectors.

The motion vector selector 140 also receives as inputs the two input fields selected by the time base changer 50 and which were used to calculate the motion vectors (suitably delayed by the system delay compensator 60 and subsampled by the subsampler 80) and supplies an output comprising one motion vector per pixel of the output field. This motion vector is selected from the four motion vectors for that block supplied by the motion vector reducer 130. Any irregularity in the selection of motion vectors by the motion vector selector 140 is removed by a motion vector post processor 150, from which the processed motion vectors are supplied to an oversampler 160. Spatially and temporally oversampled motion vectors generated by the oversampler 160 are supplied to, and control, the interpolator 70. Using the motion vectors, the interpolator 70 interpolates an output field from the corresponding two input fields selected by the time base changer 50, taking into account any image motion indicated by the motion vectors currently supplied to the interpolator 70. The two selected fields supplied to the interpolator are combined in relative proportions depending on the temporal position of the output field with respect to the two input fields (as indicated by the control signal Δ), so that a larger proportion of the nearer input field is used. The output of the interpolator 70 is the interlaced video signal 30 having 1250 lines per frame and 50 fields per second.

Figure 2:
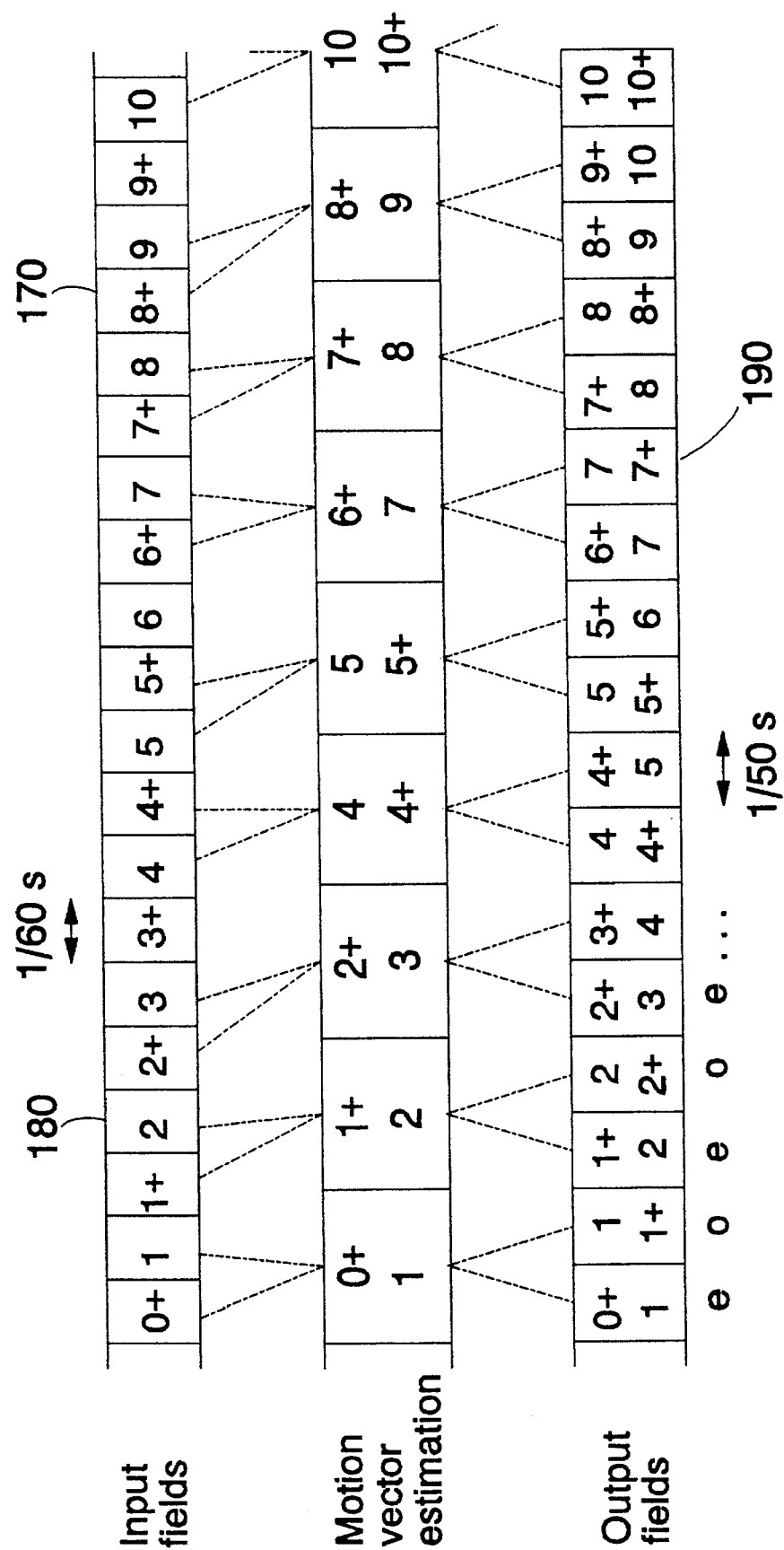
FIG. 2 is a timing diagram showing temporal subsampling performed by the apparatus of FIG. 1.

The subsampler 80 performs both spatial and temporal subsampling of the input fields selected by the time base changer 50, before those input fields are supplied to the motion processor 100. FIG. 2 is a timing diagram showing the temporal subsampling performed by the subsampler 80. In FIG. 2, the upper row represents successive fields of the input video signal 20 which, for convenience, are each identified by a respective field number. For example, an input field 170 is denoted by the number 8+, showing that this field is an odd field in an eighth frame of the input video signal 20. Similarly, a field 180 is denoted by the number 2, indicating that this field is an even field in a second frame of the input video signal 20. The bottom row of FIG. 2 represents successive even ("e") and odd ("o") fields of the output video signal.

The output video signal has a field frequency of 50 Hz, so the temporal separation of adjacent fields of the output video signal is greater than the temporal separation of adjacent fields of the input video signal. The time base changer 50 is operable to select the two input fields temporally closest to the position of an output field to be used in interpolating that output field. For each field of the output video signal, the two fields of the input video signal selected by the time base changer for use in interpolation of that output field are indicated by their respective input fields numbers. For example, an output field 190 is interpolated from the two input fields temporally closest to that output field, namely those denoted by the numbers 7 and 7+.

The motion processor 100 generates motion vectors indicative of image motion between pairs of input fields selected by the time base changer 50. However, the effect of the subsampler 80 is to supply only alternate pairs of input fields selected by the time base changer 50 to the motion processor 100, for use in the generation of motion vectors. In the example shown in FIG. 2, motion vectors are generated only from the pairs of input fields selected by the time base changer 50 for use in interpolation of even output fields, namely the following pairs of input fields: 0+,1; 1+,2; 2+,3; 4,4+; 5, 5+; 6+,7; 7+,8; 8+,9; and 10, 10+. Odd fields of the output video signal 30 are still interpolated from the two temporally nearest input fields selected by the time base changer 50, but the interpolation is performed using motion vectors generated in respect of the preceding even output field. For example, the output field 190 is interpolated from the input fields 7 and 7+, but the interpolation is carried out using motion vectors generated from the input fields 6+ and 7 (these being the input fields from which the immediately preceding even output field was interpolated).

The temporal subsampling performed by the subsampler 80 reduces by one half the processing required to generate motion vectors for use in interpolation, but results in the generation of motion vectors for use in the interpolation of even output fields only. The oversampler 160 oversamples the generated motion vectors to provide motion vectors for use in the interpolation of odd output fields. This temporal oversampling operation is relatively straightforward, in that each set of motion vectors generated by the motion processor 100 is supplied twice to the interpolator 70, for use in interpolation of two successive output fields. Thus, in respect of its temporal oversampling operation, the oversampler 160 comprises a switchable delay circuit operable to delay the motion vectors supplied during interpolation of an even output field by one output field period, so that those same motion vectors are again supplied to the interpolator during interpolation of the following odd output field.

The subsampler 80 also performs horizontal and vertical spatial subsampling of the input fields selected by the time base changer 50. Horizontal subsampling is a straightforward operation in that the input fields are first prefiltered by a half-bandwidth low pass filter (in the present case of 2:1 horizontal decimation) and alternate video samples along each video line are then discarded, thereby reducing by one half the number of samples along each video line.

Vertical subsampling of the input fields is complicated by the fact that the input video signal 20 is interlaced. This means that successive lines of video samples in each interlaced field are effectively separated by two video lines of the complete frame, and that the lines in each field are vertically displaced from those in the preceding or following field by one video line of the complete frame.

One approach to vertical subsampling would be to perform progressive scan conversion (to generate successive progressively scanned video frames each having 1125 lines) and then to subsample the progressively scanned frames by a factor of 2 to perform the vertical subsampling. However, efficient progressive scan conversion would require a degree of motion compensated processing, which processing could adversely affect the operation of the motion processor 100.

Figure 3:
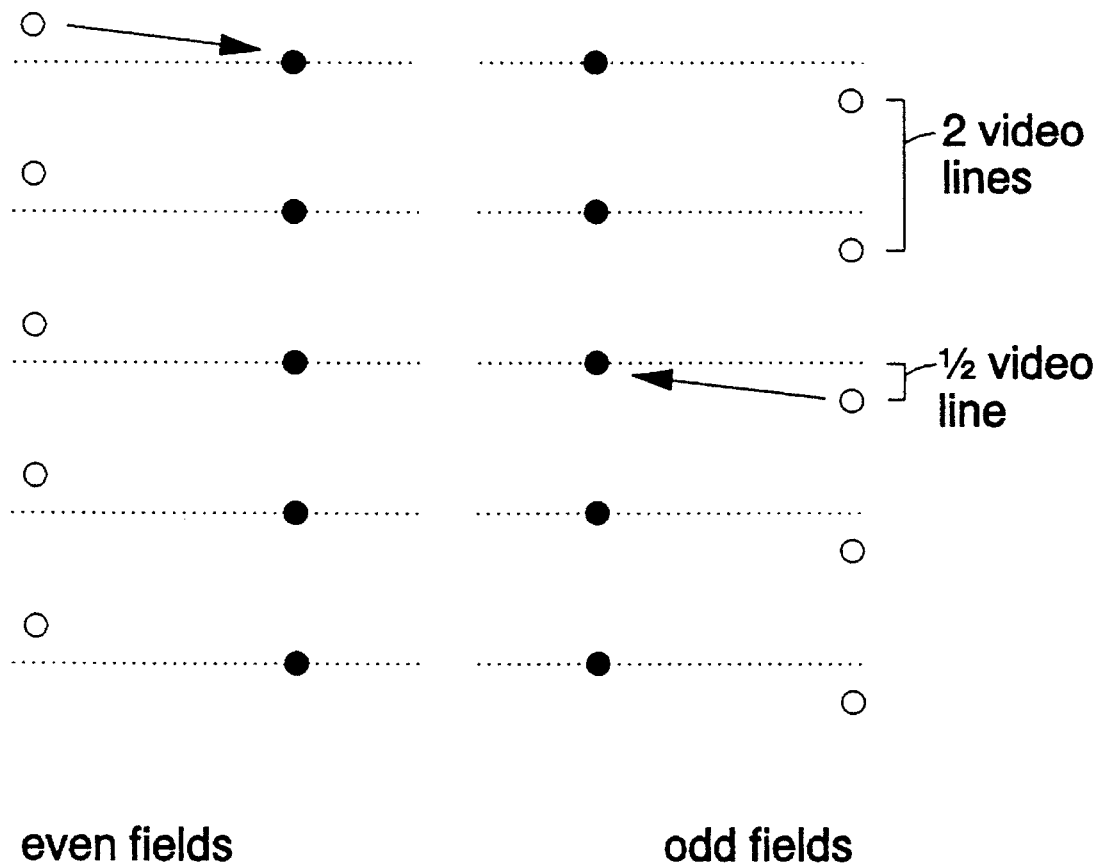
FIG. 3 is a schematic diagram illustrating vertical spatial subsampling performed by the apparatus of FIG. 1.

A simpler approach to vertical spatial subsampling is shown in FIG. 3, in which the input fields are first low pass filtered in the vertical direction (to avoid aliasing) and a filtering operation is then performed which effectively displaces each pixel vertically by half a video line downwards (for even fields) or upwards (for odd fields). The resulting displaced fields are broadly equivalent to progressively scanned frames which have been subsampled vertically by a factor of two.

In summary, therefore, the result of the subsampling operations performed by the subsampler 80 is that the motion processor 100 operates on pairs of input fields selected for use in interpolation of even output fields only, those input fields being spatially subsampled by a factor of two in the horizontal and the vertical directions. This reduces the processing required for motion vector estimation by a factor of eight.

As part of the generation of motion vectors, the direct block marcher 110 in FIG. 1 generates correlation surfaces representing correlation between blocks of the pair of input fields supplied via the subsampler from the time base changer 50. Although the fact that these input fields are spatially subsampled means that the calculation of the correlation surfaces requires less intensive processing, it also has the effect that the spatial resolution of the correlation surfaces is reduced by a corresponding amount.

Figure 4:
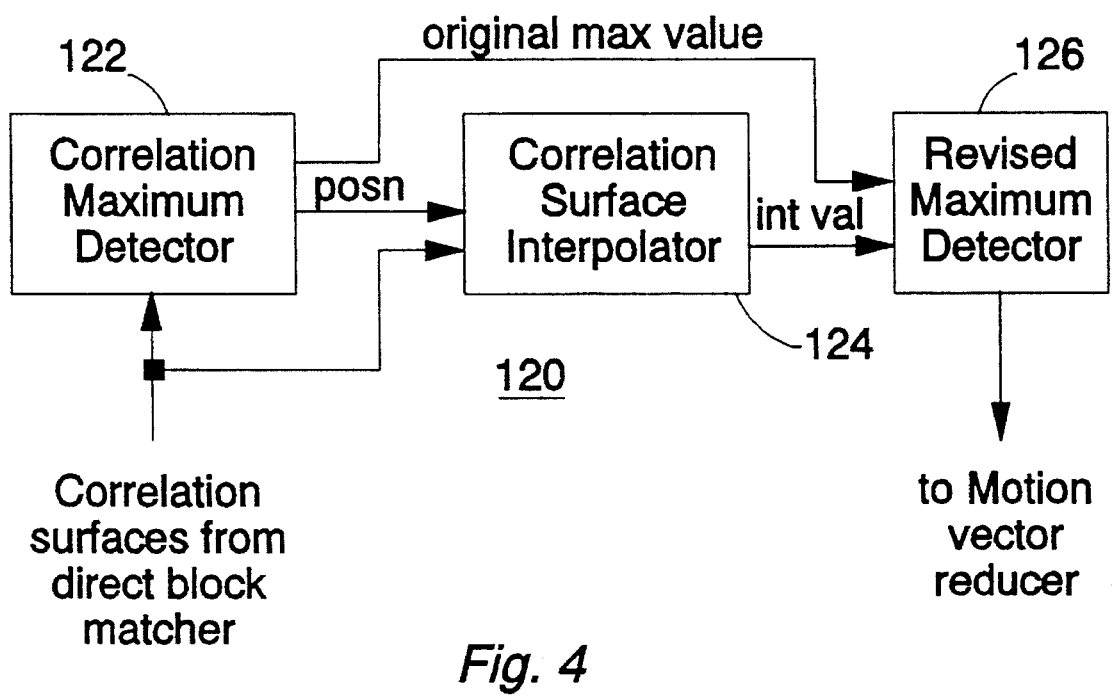
FIG. 4 is a schematic block diagram of a motion vector estimator.

FIG. 4 is a schematic block diagram of the motion vector estimator 120 showing how the reduction in spatial resolution of the correlation surfaces, caused by the spatial subsampling of the input fields, can be overcome. The motion vector estimator 120 receives correlation surfaces in digital form from the direct block marcher 110 and comprises a correlation maximum detector 122, a correlation surface interpolator 124 and a revised maximum detector 126. The revised maximum detector 126 supplies motion vectors derived from the correlation surfaces to the motion vector reducer 130.

Figure 5:
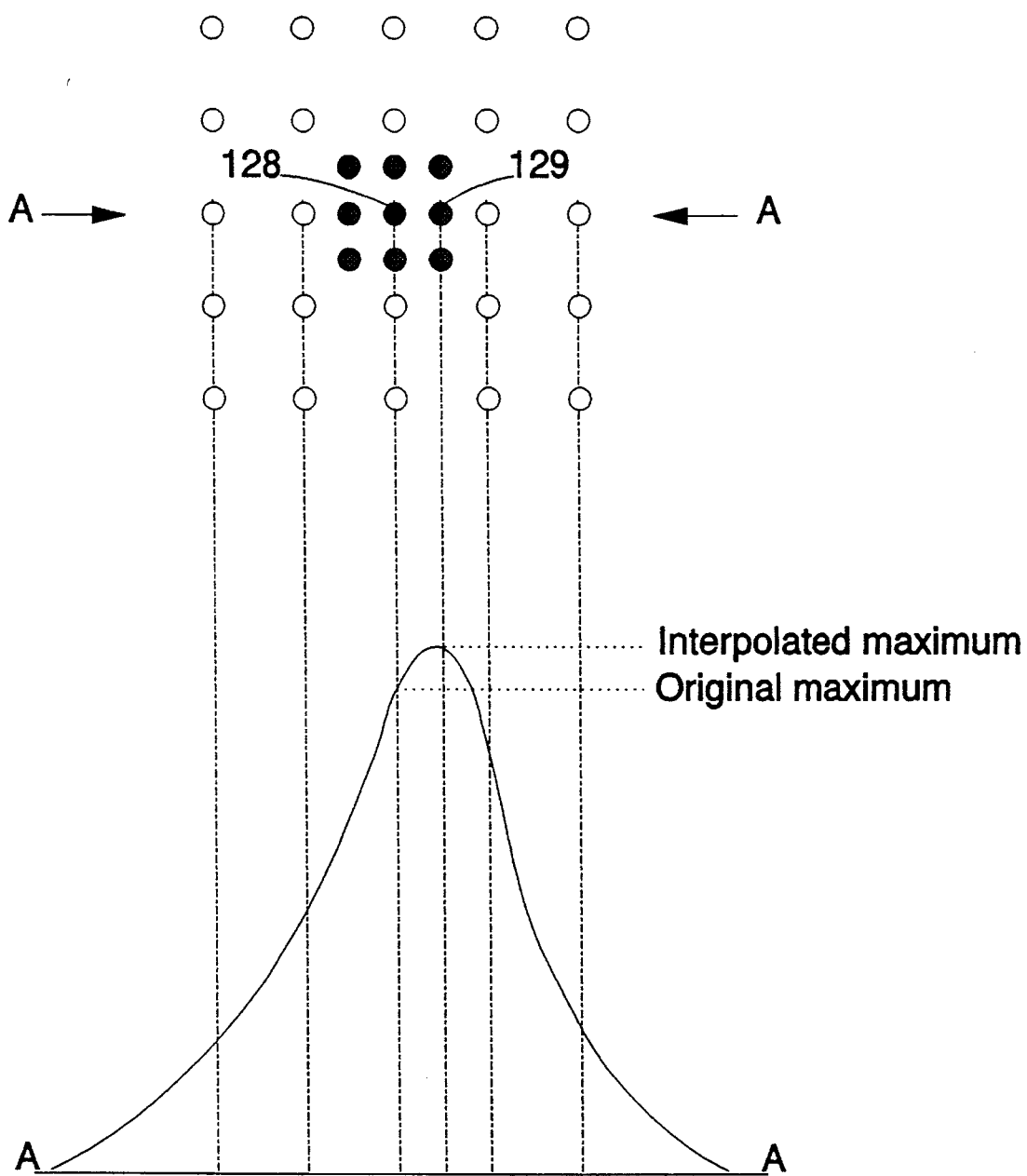
FIG. 5 schematically illustrates the interpolation of a correlation surface performed by the motion vector estimator of FIG. 4.

The operation of the motion vector estimator 120 will now be described with reference to FIG. 5, which shows an array of points on a correlation surface, along with a graphical cross section through the correlation surface (along a line A—A). The correlation maximum detector 122 receives the correlation surface from the direct block marcher 110 and detects points of maximum correlation, such as a point 128 referred to as the "original" maximum. The correlation maximum detector 122 outputs the value of the point 128 and its position on the correlation surface.

The correlation surface interpolator receives the position of the original maximum point 128 along with data representing the original correlation surface, and interpolates eight additional points surrounding the point 128 using a two-dimensional interpolator. The interpolated correlation values at the interpolated points are supplied, along with the original maximum value, to the revised maximum detector 126 which detects whether any of the interpolated correlation values represents a greater maximum than the original maximum. In the example shown in FIG. 5, an interpolated point 129 represents a greater maximum than the point 128, and so a motion vector dependent on the point 129 is generated and passed to the motion vector reducer 130.

Figure 7:
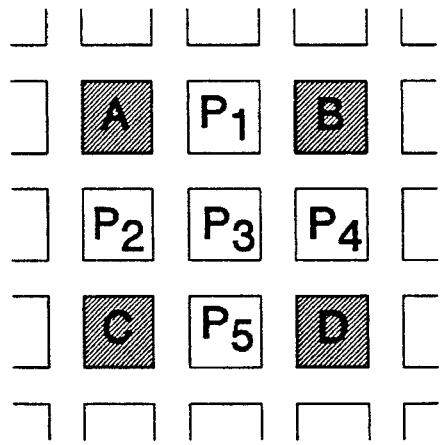
FIGS. 6 and 7 are schematic diagrams illustrating pixel interpolation performed by the apparatus of FIG. 1 during motion vector selection.
Figure 7:
Figure 7:
Figure 6:
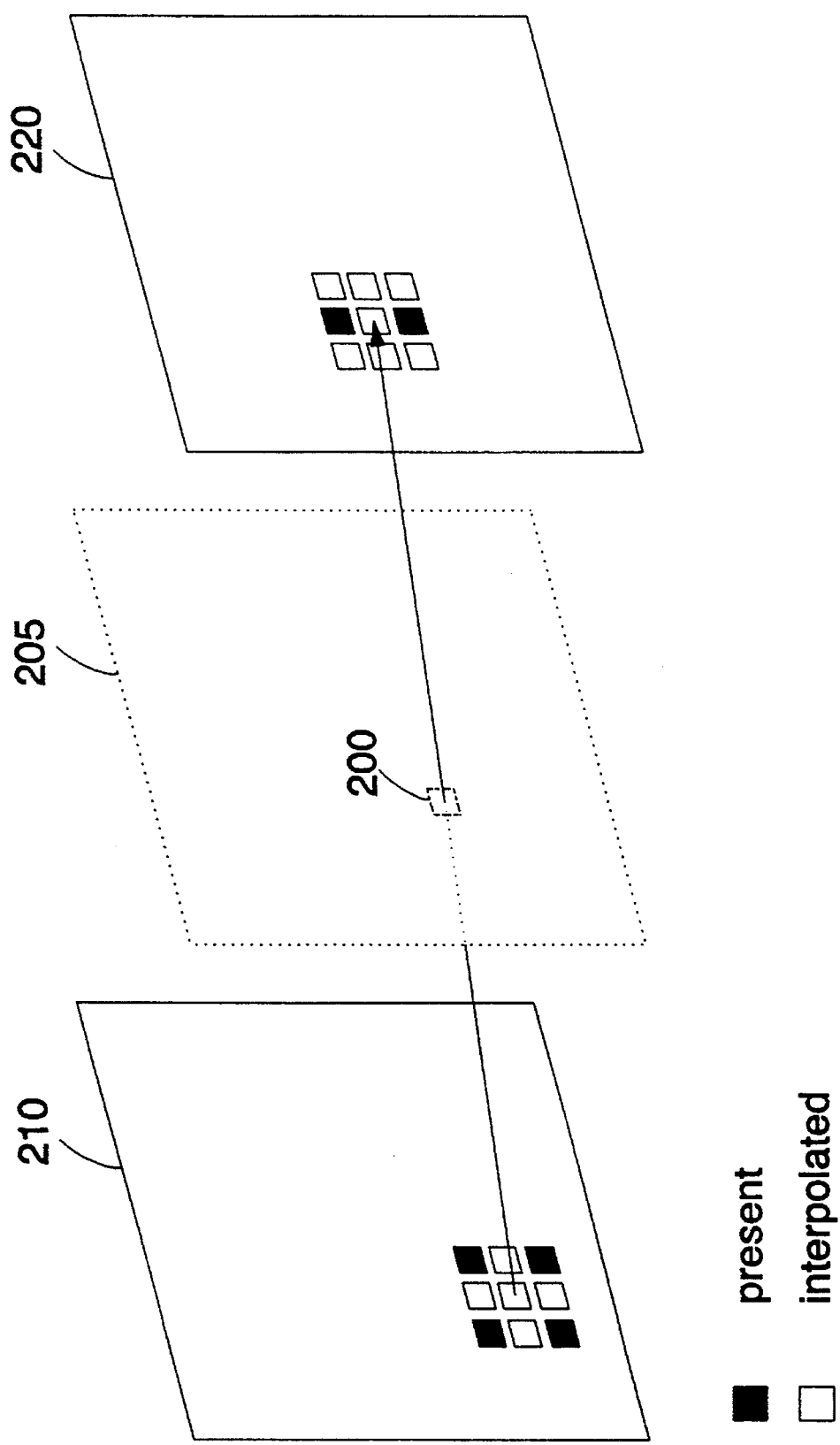

FIGS. 6 and 7 are schematic diagrams illustrating pixel interpolation performed by the motion vector selector 140.

As mentioned above, the motion vector selector 140 receives local and global motion vectors from the motion vector reducer 130, the two subsampled input fields from which the motion vectors have been generated, and the control signal A from the time base changer 50. For each pixel 200 in the current even output field 205, the motion vector selector tests each of the four possible motion vectors for that pixel by comparing blocks of pixels pointed to by that motion vector in each of the preceding and following input fields 210, 220. The comparison is made by calculating the sum of absolute luminance differences between corresponding pixels in the two blocks, with a lower sum indicating a higher correlation between the blocks. However, because the input fields 210, 220 are subsampled by a factor of two in the horizontal direction and a factor of two in the vertical direction, alternate pixels are missing from the blocks, so interpolation is used to reconstruct the missing pixels for the test performed during motion vector selection. In FIG. 7, missing pixels to be interpolated are represented by $P_1$ to $P_5$, and are generated from the existing pixels A, B, C, and D as follows:

$P_1=(A+B)/2$;
$P_2=(A+C)/2$;
$P_3=(A+B+C+D)/4$; and so on.

Although the interpolation of correlation surfaces by the motion vector estimator and the interpolation of pixels during motion vector selection have been described with reference to an embodiment in which motion vectors are derived from subsampled input fields, the two techniques are each separately applicable when subsampling is not employed. In these cases the techniques can be used to generate and select motion vectors having a higher spatial resolution than the images (fields or frames) to be used for interpolation. The use of motion vectors having a sub-pixel accuracy can improve the portrayal of motion in the interpolated images.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Motion compensated video signal processing apparatus, comprising:

means for selecting corresponding pairs of temporally adjacent fields of an input digital video signal for use in interpolation of respective fields of an output digital video signal;

a subsampler for horizontally and temporally subsampling the selected pairs of fields of said input digital video signal to generate a subsampled video signal;

a motion vector processor for generating motion vectors from said subsampled video signal, said motion vectors representing image motion between at least a subset of the selected pairs of video fields of said input digital video signal; and a motion compensated video processor for processing said input digital video signal according to said motion vectors to generate said output digital video signal, said motion compensated video processor including a motion compensated interpolator for interpolating video fields of said output digital video signal from the selected pairs of video fields of said input digital video signal.

2. Apparatus according to claim 1, in which:

said input digital video signal comprises successive interlaced input video fields; and said output digital video signal comprises successive interlaced output video fields.

3. Apparatus according to claim 1, in which:

said input digital video signal comprises data representing successive horizontally scanned lines of pixels; and said subsampler comprises means for horizontally decimating each line of pixels of said input digital video signal, thereby substantially halving a number of pixels in each said line of pixels.

4. Apparatus according to claim 2, in which said subsampler comprises means for vertically subsampling said input digital video signal.

5. Apparatus according to claim 4, in which said subsampler comprises means for vertically displacing pixels of said input digital video signal.

6. Apparatus according to claim 5, in which said means for vertically displacing pixels is operable to displace pixels of alternate video fields of said input digital video signal in opposite vertical directions.

7. Apparatus according to claim 1, in which said subset comprises only those pairs of video fields of said input digital video signal used to interpolate alternate fields of said output digital video signal.

8. Apparatus according to claim 1, in which said motion vector processor comprises:

means for comparing a search block within one of each said pair of fields of said subsampled video signal supplied to said motion vector processor with a respective search area, comprising a plurality of blocks, in the other of said pair of fields, to generate an array of original correlation values representing correlation between said search block and said search area;

means for generating one or more interpolated correlation values from said original correlation values; and means for detecting an original correlation value or interpolated correlation value representing a point of maximum correlation between said search block and said search area, and for generating a motion vector in dependence on said detected correlation value.

9. Apparatus according to claim 8, in which said means for generating comprises:

means for detecting an original correlation value representing a highest correlation in said array of original correlation values; and means for generating a plurality of interpolated correlation values adjacent to said original correlation value representing said highest correlation in said array of original correlation values.

10. Apparatus according to claim 1, in which said subsampler comprises means for low-pass filtering said input video signal prior to subsampling said input video signal.

11. Apparatus according to claim 1, in which said motion vector processor is operable to generate a plurality of motion vectors for each pixel of each output field of said output digital video signal from said corresponding pair of input fields of said input digital video signal; said apparatus comprising:

means for testing said motion vectors, to select a motion vector for use in interpolation of a pixel of an output field, comprising means for detecting correlation between test blocks of said pair of input fields pointed to by a motion vector under test, each test block comprising test pixels of said pair of input fields pointed to by said motion vector under test and pixels interpolated from said test pixels; and means for selecting, from said plurality of motion vectors, a motion vector having a highest correlation between said test blocks pointed to by said motion vector.

12. A method of motion compensated video signal processing, said method comprising the steps of:

selecting corresponding pairs of temporally adjacent fields of an input digital video signal for use in interpolation of respective fields of an output digital video signal;

horizontally and temporally subsampling the selected pairs of fields of said input digital video signal to generate a subsampled video signal;

generating motion vectors from said subsampled video signal, said motion vectors representing image motion between at least a subset of the selected pairs of video fields of said input digital video signal; and processing said input digital video signal according to said motion vectors to generate said output digital video signal, including interpolating video fields of said output digital video signal from the selected pairs of video fields of said input digital video signal.

13. Motion compensated video signal processing apparatus in which motion vectors are generated to represent image motion between a pair of input images from which an output image is to be derived by motion compensated interpolation; each said input image and said output image comprising a respective plurality of pixels, said apparatus comprising:

means for generating a plurality of motion vectors for each pixel of said output image;

means for testing said motion vectors, to select a motion vector for use in interpolation of a pixel of said output image, comprising means for detecting correlation between test blocks of said input images pointed to by a motion vector under test, each test block comprising test pixels of said input images pointed to by said motion vector under test and pixels interpolated from said test pixels; and means for selecting, from said plurality of motion vectors, said motion vector having a highest correlation between said test blocks pointed to by said motion vector.

14. Television standards conversion apparatus comprising apparatus according to claim 13.

15. A method of motion compensated video signal processing in which motion vectors are generated to represent image motion between a pair of input images from which an output image is to be derived by motion compensated interpolation; each said input image and said output image comprising a respective plurality of pixels, said method comprising the steps of:

generating a plurality of motion vectors for each pixel of said output image;

testing said motion vectors, to select a motion vector for use in interpolation of a pixel of said output image, by detecting correlation between test blocks of said input images pointed to by a motion vector under test, each test block comprising test pixels of said input images pointed to by said motion vector under test and pixels interpolated from said test pixels; and selecting, from said plurality of motion vectors, a motion vector having a highest correlation between said test blocks pointed to by said motion vector.

16. Television standards conversion apparatus comprising apparatus according to claim 1.

* * * * *